United States Patent [19]

Seibel

[11] Patent Number: 5,491,031
[45] Date of Patent: Feb. 13, 1996

[54] COATING COMPOSITION FOR METAL SUBSTRATES

[75] Inventor: Lawrence P. Seibel, Kenosha, Wis.

[73] Assignee: The Dexter Corporation, Windsor Locks, Conn.

[21] Appl. No.: 340,046

[22] Filed: Nov. 14, 1994

[51] Int. Cl.$^6$ .............................. C08L 61/14; C08L 61/10
[52] U.S. Cl. ........................ 428/458; 428/460; 428/461; 428/462; 428/465; 525/132; 525/134; 525/143; 525/480; 525/481; 525/491; 525/501
[58] Field of Search ................................. 428/458, 460, 428/461, 462, 465; 525/480, 481, 491, 501, 132, 134, 143

[56] References Cited

U.S. PATENT DOCUMENTS 3,613,613  10/1971  Loritz et al. ..................... 113/80 DA
3,931,109  1/1976  Martin ................................ 260/47 E

FOREIGN PATENT DOCUMENTS

86/038744  7/1961  Japan.

OTHER PUBLICATIONS

P. Palackdharry et al., *Modern Paint and Coatings*, Jun. 1989, pp. 78, 82 and 85.

*Primary Examiner*—W. Robinson Clark
*Attorney, Agent, or Firm*—Marshall, O'Toole, Gerstein, Murray & Borun

[57] ABSTRACT

A coating composition for application to primed metal substrates as a topcoat is disclosed. The coating composition is especially useful on metal closures for vacuum-packed food products. The coating composition is free of a halide-containing vinyl polymer and comprises: (a) an epoxy novolac resin, (b) a phenolic resin, (c) a polyester, and (d) an elastomer, in (e) a nonaqueous carrier.

25 Claims, No Drawings

COATING COMPOSITION FOR METAL SUBSTRATES

FIELD OF THE INVENTION

The present invention relates to coating compositions for metal substrates, methods of protecting a metal substrate, and metal articles having a protective coating composition applied thereon. The coating composition comprises: (1) an epoxy novolac resin, (b) a phenolic resin, (c) a polyester and (d) an elastomer, and is free of a halide-containing vinyl polymer. The coating composition, after curing, is useful as a topcoat for the interior of metal closures and demonstrates excellent flexibility and excellent adhesion to primer coats and to plastisol gaskets.

BACKGROUND OF THE INVENTION

It is well-known that an aqueous solution in contact with an untreated metal substrate can result in corrosion of the untreated metal substrate. Therefore, a metal article, such as a metal closure or container for a water-based product, like a food or beverage, is rendered corrosion resistant in order to retard or eliminate interactions between the water-based product and the metal article. Generally, corrosion resistance is imparted to the metal article, or to a metal substrate in general, by passivating the metal substrate or by coating the metal substrate with a corrosion-inhibiting coating.

Investigators continually have sought improved coating compositions that reduce or eliminate corrosion of a metal article and that do not adversely affect an aqueous product packaged in the metal article. For example, investigators have sought to improve the imperviousness of the coating in order to prevent corrosion-causing ions, oxygen molecules and water molecules from contacting and interacting with a metal substrate. Imperviousness can be improved by providing a thicker, more flexible and more adhesive coating, but often, improving one particular advantageous property is achieved at the expense of another advantageous property.

In addition, practical considerations limit the thickness, adhesive properties and flexibility of a coating applied to a metal substrate. For example, thick coatings are expensive, require a longer cure time, can be esthetically unpleasing and can adversely affect the process of stamping and molding the coated metal substrate into a useful metal article. Similarly, the coating should be sufficiently flexible such that the continuity of the coating is not destroyed during stamping and molding of the metal substrate into the desired shape of the metal article.

Investigators also have sought coatings that possess chemical resistance in addition to corrosion inhibition. A useful coating for the interior of a metal closure or container must be able to withstand the solvating properties of the packaged product. If the coating does not possess sufficient chemical resistance, components of the coating can be extracted into the packaged product and adversely affect the product. Even small amounts of extracted coating components can adversely affect sensitive products by imparting an off-taste to the product.

Organic solvent-based coating compositions provide cured coatings having excellent chemical resistance. Such solvent-based compositions include ingredients that are inherently water insoluble, and thereby effectively resist the solvating properties of water-based products packaged in the metal container.

Epoxy-based coatings and polyvinyl chloride-based coatings have been used to coat the interior of metal closures and containers for foods and beverages because these coatings exhibit an acceptable combination of adhesion, flexibility, chemical resistance and corrosion inhibition. Polyvinyl chloride-based coatings and vinyl acetate/vinyl chloride copolymer-based (i.e., solution vinyl) coatings also have been the topcoat of choice for the interior of metal closures because these coatings provide excellent adhesion to plastisol sealer gaskets applied over the cured topcoat. However, epoxy-based coatings and polyvinyl chloride-based coatings have serious disadvantages that investigators still are attempting to overcome.

For example, polyvinyl chloride-based coating compositions are thermoplastic. Thermoplastic coatings used as the topcoat of the interior coating of metal closures have inherent performance disadvantages, such as potential softening during the closure manufacturing process or under food processing conditions. Therefore, coating compositions having a thermosetting character have been investigated.

In addition, coatings based on polyvinyl chloride or a related halide-containing vinyl polymers, like polyvinylidene chloride, possess the above-listed advantageous properties of chemical resistance and corrosion inhibition, and are economical. However, curing a polyvinyl chloride or related halide-containing vinyl polymer can generate toxic monomers, such as vinyl chloride, a known carcinogen. In addition, the disposal of a halide-containing vinyl polymer, such as by incineration, also can generate toxic monomers. The generated vinyl chloride thereby poses a potential danger to workers in metal can and closure manufacturing plants, in food processing and packaging plants, and at disposal sites. Disposal of polyvinyl chloride and related polymers also can produce carcinogenic dioxins and environmentally-harmful hydrochloric acid.

Government regulators are acting to eliminate the use of polyvinyl chloride-based coating compositions that contact food, and thereby eliminate the environmental and health concerns associated with halide-containing vinyl polymers. Presently however, polyvinyl chloride-based compositions are still the predominant coating used to coat the interior of food and beverage containers and closures.

To overcome the environmental concerns and performance problems associated with polyvinyl chloride-based coating compositions, epoxy-based coating compositions recently have been used to coat the interior of food and beverage containers. However, epoxy-based coatings also possess disadvantages. For example, epoxy-based coating compositions are more expensive than polyvinyl chloride-based coating compositions.

With respect to a metal closure for a food container, the interior of a metal closure conventionally was coated with three separate coating compositions, i.e., a three-coat system. First, an epoxy/phenolic primer was applied to the metallic substrate and cured, then a vinyl-based middle coat was applied over the cured primer. Finally, after curing the middle coat, a specially-formulated topcoat capable of adhering to a plastisol sealer was applied over the cured middle coat. The plastisol sealer is applied over the cured topcoat, and formed into a gasket during manufacture of a metal closure from a metal sheet having the three cured layers of coatings applied thereon.

Two-coat systems presently are used commercially, but also exhibit disadvantages. Therefore, investigators are attempting to develop an improved two-coat system for coating the interior of a metal closure. An ideal two-coat system maintains corrosion inhibition, lowers the cost of applying the coatings, has improved rheological properties and had improved cured film integrity. Cost savings are realized both in applying one fewer coating composition to the metal substrate and in time saved by applying only two coats rather than three coats to the metal substrate.

A two-coat system for the interior of metal food closure comprises a primer (i.e., a size) and a topcoat. The metal closures typically are used in conjunction with a glass or plastic container. The topcoat must have sufficient adhesion to the primer or the coating will fail. In order to achieve sufficient intercoat adhesion, the chemical makeup of the topcoat often was dictated by the chemical makeup of the primer. Investigators therefore have been seeking a more "universal" topcoat, i.e., a topcoat that can be applied to a variety of different primers and that exhibits sufficient intercoat adhesion. Such a universal topcoat would be a significant advance in the art.

The coatings used on the interior of a metal food closure also must meet other criteria in addition to performance. For example, the coatings must incorporate components acceptable to the U.S. Food and Drug Administration (FDA) because the cured coating composition contacts food products.

The cured primer and topcoat therefore require sufficient adhesion to maintain film integrity during closure fabrication. The cured primer and topcoat also require sufficient flexibility to withstand closure fabrication. Sufficient coating adhesion and flexibility are needed for the closure to withstand processing conditions the closure is subjected to during product packaging.

Other required performance features of the cured coatings include corrosion protection and adequate adhesion to the plastisol gasket applied over the cured topcoat. Also, the cured coating composition requires sufficient chemical resistance and sufficient abrasion and mar resistance.

In the manufacture of a metal closure, a metal sheet is coated with the coating compositions, and each coating is cured individually, then the metal sheet is formed into the shape of a metal closure. The closures are made in a variety of sizes ranging from 27 mm (millimeter) to 110 mm in diameter. During manufacture, a plastisol material is molded in the form of a gasket, and typically a polyvinyl chloride-based gasket. The gasket is applied over the cured coatings on the interior of the metal closure to ensure an effective seal between the metal closure and glass container, and to maintain the vacuum condition of the packaged food product.

Product packaging is performed under processing conditions wherein the plastisol gasket is softened. When the metal closure is pressed onto the glass container, the threads on the glass container form impressions in the softened plastisol gasket. The metal closure is secured in place both by the thread impressions and by the vacuum produced by subsequent cooling. This type of metal closure is used for baby food containers and for other packaged food and beverage products, such as juices and gravies. Other types of closures are designed to be secured to glass containers by lugs rather than by thread impressions in the plastisol.

Vinyl chloride-based topcoat compositions have been softened both by product processing conditions, and by conditions encountered during closure manufacture, thereby leading to closure failure. The present invention is directed, in part, to overcoming such closure failures.

Investigators therefore have sought a two-coat system for the interior of metal closures used for vacuum-packed food products. Investigators have particularly sought a vinyl halide-free topcoat for the interior of metal closures for food and beverages that retains the advantageous properties of a vinyl chloride-based topcoat, such as adhesion, flexibility, chemical resistance, corrosion inhibition and favorable economics. Investigators especially have sought a coating composition that demonstrates these advantageous properties and also reduces the environmental and toxicological concerns associated with halide-containing vinyl polymers.

Two-coat systems have been investigated and used for application to the interior of metal closures. The investigators sought and used topcoat compositions having a sufficiently flexible cured coating such that a coated metal substrate can be deformed without destroying film continuity. The conventional epoxy resins used in the topcoats provided good adhesion to plastisol gaskets, but also often provided a rigid cured film thereby making it difficult to impossible to coat the metal substrate prior to deforming, i.e., shaping, the metal substrate into a metal article, like a metal closure. Coating a metal substrate prior to shaping the metal substrate is the present standard industrial practice.

For example, the publication P. Palackdharry et al., "Interior Two-Coat System Covers Metal Food Closures", *Modern Paint and Coatings*, June, 1989, pp. 78, 82 and 85, discloses a topcoat composition comprising a relatively low amount of phenolic resin, polyester and elastomer relative to the present composition. Japanese Patent JP 86/038744 discloses a coating composition for metal cans comprising a polyester, phenolic and epoxy resin. The disclosed composition also contains a polyvinyl chloride.

The above-identified patent and publication disclose coating compositions comprising an epoxy resin, a polyester and a phenolic resin. The patent and publication do not disclose a coating composition comprising an epoxy novolac resin; a polyester; a phenolic resin; and an elastomer in the amounts and ratios disclosed herein, wherein the coating composition is free of a halide-containing vinyl polymer.

Although the above-identified patent and publication disclose coating compositions for the interior of a metal food closure, the patent and publication do not disclose a topcoat composition that includes an epoxy novolac resin, a phenolic resin, a polyester and an elastomer, wherein the composition is free of a halide-containing vinyl polymer, and which, after curing, demonstrates: (1) excellent flexibility; (2) excellent adhesion to the primer coat; (3) excellent chemical resistance and corrosion inhibition; (4) excellent adhesion to the plastisol gasket; and (5) reduced environmental and toxicological concerns.

As an added advantage, a present topcoat coating composition is an improved two-coat system, thereby eliminating the time and expense attributed to applying a conventional third coat to the metal substrate. The present topcoat coating composition also can be used with a variety of types of primers without a significant decrease in coating properties.

SUMMARY OF THE INVENTION

The present invention is directed to a coating composition that, after curing, effectively inhibits corrosion of metal substrates, is flexible and exhibits excellent adhesion both to a primer coat and to a variety of plastisol gaskets used to ensure the vacuum seal of a metal closure to a glass container. The present coating composition comprises: an epoxy novolac resin, a phenolic resin, a polyester and an elastomer. The present coating composition also is free of a halide-containing vinyl polymer, such as polyvinyl chloride. Nevertheless, after curing and crosslinking, the coating compositions demonstrate excellent adhesion both to a primer coat and to a plastisol gasket.

The coating composition effectively inhibits corrosion of ferrous and non-ferrous metal substrates when the composition is applied as a topcoat to a metal substrate, then cured for a sufficient time and at a sufficient temperature to provide a crosslinked coating. A cured and crosslinked coating demonstrates sufficient chemical and physical properties for use as the topcoat of a two-coat system on the interior of metal closures used in packaging foods and beverages. The coating composition does not adversely affect products packaged in a container having a metal closure coated on the interior surface with the cured composition.

In particular, the present coating composition comprises: (1) about 13% to about 30%, by weight of nonvolatile material, of an epoxy novolac resin; (b) about 40% to about 60%, by weight of nonvolatile material, of a phenolic resin; (c) about 15% to about 30%, by weight of nonvolatile material, of a polyester; and (d) about 5% to about 20%, by weight of nonvolatile material of an elastomer, wherein the composition is free of a halide-containing vinyl polymer. In accordance with an important feature of the present invention, the weight ratio of epoxy novolac resin to phenolic resin is about 33:66 to about 25:75. The elastomer and polyester are present in a weight ratio of elastomer to polyester of about 1:1 to about 1:2.

Components (a) through (d) are dispersed in a nonaqueous carrier such that the total coating composition includes about 20% to about 50%, by weight of the total composition, of components (a), (b), (c) and (d). Other optional components, such as a pigment, a filler or a lubricant also can be included in the composition, and accordingly increase the weight percent of total nonvolatile material in the composition to above about 50% by weight of the total coating composition.

As used here and hereinafter, the term "coating composition" is defined as the composition including the epoxy novolac resin, the phenolic resin, the polyester, the elastomer, and any optional ingredients dispersed in the nonaqueous carrier; the term "cured coating composition" is defined as the adherent polymeric coating resulting from curing a coating composition. The cured coating composition comprises the epoxy resin, the phenolic resin, the polyester and the elastomer essentially in the amounts these ingredients are present in the coating composition, expressed as non-volatile material.

Therefore, one important aspect of the present invention is to provide a coating composition that enhances the ability of the primer to inhibit corrosion of ferrous and nonferrous metal substrates. After application to a primed metal substrate as a topcoat, and subsequent curing at a sufficient temperature for a sufficient time, the coating composition provides an adherent layer of a cured coating composition. The cured coating composition enhances corrosion inhibition, has excellent flexibility and exhibits excellent adhesion both to a variety of different of primer types applied to the metal substrate and to a variety of different types of plastisol sealer gaskets applied over the cured coating composition.

Because of these properties, an improved two-coat system is available for application to the metal substrate thereby providing economies in time, material and machinery in the coating of a metal substrate. The coating composition also provides economies because the composition can be used with a variety of primers and plastisol gaskets of different chemical types. The closure manufacturer therefore can use the coating composition in a more universal range of applications, thereby eliminating the need to carry an inventory of different topcoats and eliminating application equipment changeover.

In accordance with another important aspect of the present invention, the cured coating composition demonstrates excellent flexibility and adhesion with respect to the plastisol sealer gasket. The excellent adhesion between the cured coating composition and the plastisol sealer gasket further improves the vacuum seal between a metal closure and a glass container to maintain product integrity, and the excellent flexibility facilitates processing of the coated metal substrate into a coated metal article, like in molding or stamping process steps, such that the cured coating remains in continuous and intimate contact with the primer on the metal substrate.

In accordance with yet another important aspect of the present invention, the cured coating composition demonstrates an excellent flexibility and adhesion even though the coating composition does not include a halide-containing vinyl polymer. Conventional coating compositions included a polyvinyl chloride to impart flexibility to the cured coating and to provide adhesion to the plastisol gasket. However, the presence of polyvinyl chloride adversely affected the heat resistance of the cured composition. The present coating composition, which excludes a halide-containing vinyl polymer, has excellent heat resistance, and, surprisingly, excellent flexibility.

In accordance with yet another important aspect of the present invention, a primed metal substrate coated on at least one surface with a cured coating composition of the present invention can be formed into a metal closure for a glass or plastic container that holds food products. Conventionally, a particular type of topcoat was applied over a particular primer in order to achieve sufficient intercoat adhesion. The present coating composition overcomes this disadvantage, and provides a cured coating composition that exhibits sufficient intercoat adhesion with a variety of types of primers, and with a variety of types of plastisol sealers.

These and other aspects and advantages of the present invention will become apparent from the following detailed description of the preferred embodiments.

DETAILED DESCRIPTION OF THE PREFERRED EMBODIMENTS

A coating composition of the present invention, after curing, provides a cured coating composition that effectively enhances corrosion inhibition of primed metal substrates, such as, but not limited to, aluminum, iron, steel and copper. A present coating composition, after curing, also demonstrates excellent adhesion to the primer coat applied to the metal substrate and to a plastisol gasket; excellent chemical resistance and scratch resistance; and excellent flexibility.

Accordingly, a coat between the primer and topcoat, i.e., the middle coat, is eliminated. The present coating compositions therefore are useful in an improved two-coat system comprising a primer and a topcoat. The present coating compositions are especially useful as the topcoat of a two-coat system for the interior of a metal closure for vacuum-packed food products.

In general, a present coating composition comprises: (a) an epoxy novolac resin; (b) a phenolic resin; (c) a polyester; (d) an elastomer; and (e) a nonaqueous carrier. A coating composition of the present invention is free of a halide-containing vinyl polymer. In addition, a present coating composition can include optional ingredients that improve the esthetics of the composition, that facilitate processing of the composition, or that improve a functional property of the composition. The individual composition ingredients are described in more detail below.

(a) Epoxy Novolac Resin

The coating composition of the present invention comprises an epoxy novolac resin in an amount of about 13% to about 30%, and preferably about 15% to about 25%, by weight of nonvolatile material. To achieve the full advantage of the present invention, the coating composition has from about 20% to about 25% of the epoxy novolac resin, by weight of nonvolatile material.

An epoxy novolac resin useful in the present composition is a polyfunctional epoxy resin having an epoxy functionality of about 2, and preferably greater than about 2, to about 6, and preferably greater than about 2 to about 5. The epoxy novolac resin is a low molecular weight resin having an epoxide equivalent weight (EEW) of about 100 to about 220, and preferably an EEW of about 150 to about 210.

Epoxy novolac resins useful in the present invention include for example, but are not limited to, epoxy phenol novolac resins. Epoxy phenol novolac resins are represented by general structural formula (I) wherein n is about 0.2 to about 4.

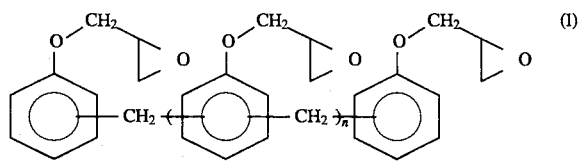

The multifunctional epoxy phenol novolac resins contain a phenolic hydroxyl group per phenyl ring in random para-para', ortho-para', and ortho-ortho' combinations. Epoxidation with epichlorohydrin yields the highly functional epoxy phenol novolac resins. The epoxy phenol novolac resin can be a high viscosity liquid (i.e., n about 0.2) or a solid (i.e., n greater than 3).

Nonlimiting examples of an epoxy phenol novolac resin useful in the present invention are ARALDITE® EPN 1139 available from CIBA-GEIGY Corp., Hawthorne, N.Y., and D.E.N. 431, available from Dow Chemical Co., Midland, Mich.. These epoxy phenol novolac resins have an n value (from structural formula I) of 0.2, an EEW of 175 and an epoxy functionality of 2.2, and have provided a useful coating composition that effectively inhibits corrosion of metal substrates. Other nonlimiting examples of epoxy phenol novolac resins are D.E.N. 438 and ARALDITE® EPN 1138, available from Dow Chemical Co. and CIBA-GEIGY Corp., respectively, and having an n value of 1.6, an EEW of 178 and an epoxy functionality of 3.6; and D.E.N. 439 available from Dow Chemical Co. and having an n value of 1.8, an EEW of 200 and an epoxy functionality of 3.8.

Another useful class of epoxy novolac resins is the epoxy cresol novolac resins depicted in general structural formula (II), wherein n is about 1.7 to about 4.4.

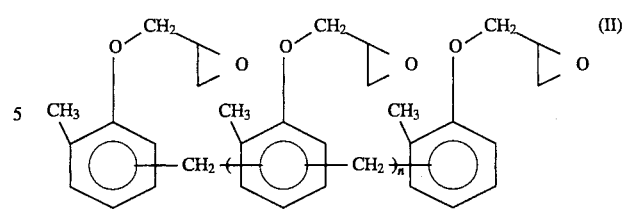

The epoxy cresol novolac resins are prepared by glycidylation of o-cresol-formaldehyde condensates in the same manner as the epoxy phenol novolac resins. The epoxy functionality of the epoxy cresol novolac resins is about 2.7 to about 5.4.

Other useful epoxy novolac resins, i.e., polyfunctional epoxy resins, include but are not limited to a polynuclear phenol-glycidyl ether resin, such as the tetraglycidyl ether of tetrakis(4-hydroxyphenyl)ethane depicted in structural formula (III), and having an EEW of about 185 to about 210 and a theoretical epoxy functionality of four.

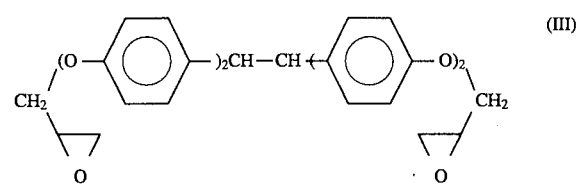

A tetraglycidylmethylenedianiline resin exemplified in structural formula (IV), as N,N,N',N'-tetraglycidyl- 4,4'-diaminophenylmethane, having an EEW of about 117 to about 133 and an epoxy functionality of about 4 also can be used as the epoxy novolac resin.

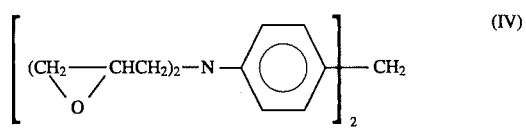

In addition, triglycidyl p-aminophenol resins, available from CIBA-GEIGY Corp., and having an EEW of about 105 to about 114 and an epoxy functionality of about 3 can be used as the epoxy novolac resin.

Another exemplary epoxy novolac resin is a triglycidyl isocyanurate depicted in structural formula (V) and having an epoxy functionality of about 3 and an EEW of about 108.

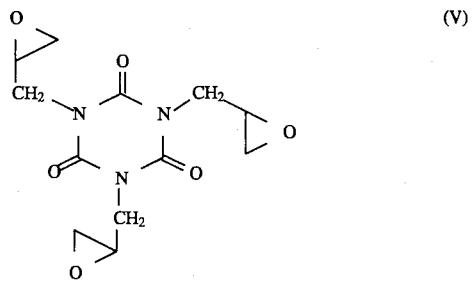

An epoxy novolac resin provides a sufficient number of crosslinking sites such that a coating composition can be cured and provide sufficient chemical and physical properties for a cured coating composition. A cured coating composition also demonstrates excellent physical properties, such as scratch resistance, adhesion and flexibility. An epoxy novolac resin also provides a sufficient number of crosslinking sites such that a cured coating composition has excellent barrier properties (i.e., exhibits excellent corrosion control).

(b) Phenolic Resin

In addition to the epoxy novolac resin, the coating composition also comprises from about 40% to about 60%, and preferably about 40% to about 50%, by weight of nonvolatile material, of a phenolic resin. To achieve the full advantage of the present invention, the coating composition has about 45% to about 50%, by weight of nonvolatile material, of a phenolic resin.

The phenolic resin is present in a sufficient amount to crosslink with the epoxy novolac resin and provide a cured coating composition having sufficient flexibility to resist cracking and having sufficient chemical and physical properties to resist chemical attack and scratching.

Generally, the phenolic resin utilized in the present composition is a condensation product resulting from a reaction between a phenol and formaldehyde, and has a low molecular weight of about 1,000 to about 8,000, and preferably about 3,000 to about 5,000. Phenol or essentially any other compound including a hydroxyphenyl moiety, like cresylic acid, can be used as the phenol component of the phenolic resin. Nonlimiting examples of suitable phenol compounds include phenol, cresylic acid and bisphenol A. Bisphenol A is the preferred phenol component of the phenolic resin.

To achieve the full advantage of the present invention, bisphenol A and formaldehyde are used as the components of the phenolic resin. The combination of bisphenol A and formaldehyde provides a phenolic resin that, when incorporated into a coating composition of the present invention, imparts excellent adhesion of the coating composition both to the primer coating and to a variety of plastisol gaskets that can be applied over the cured composition coating. Cresylic acid can be included in the phenolic resin to further enhance the corrosion-inhibiting properties of the coating composition.

An exemplary phenolic resin utilized in the present coating composition includes about 24% by weight bisphenol A, and about 7% by weight formaldehyde. This phenolic resin is incorporated into a present coating composition as a solution containing about 50% by weight of the phenolic resin.

In accordance with an important feature of the present invention, the epoxy novolac resin and phenolic resin are present in the coating composition in a weight ratio of epoxy novolac resin to phenolic resin of about 25:75 (i.e., 1:3) to about 33:66 (i.e., 1:2), and preferably about 30:70 to about 40:60. As will be demonstrated hereafter, the properties of the cured coating composition are optimized when the ratio of epoxy novolac resin to phenolic resin is maintained within this weight range.

(c) Polyester

In addition to the epoxy novolac resin and the phenolic resin, the present coating composition comprises a polyester to impart flexibility to the cured coating composition. The polyester is present in an amount of about 15% to about 30%, and preferably about 15% to about 25%, by weight of nonvolatile material. To achieve the full advantage of the present invention, the polyester is present in an amount of about 20% to about 25%, by weight of nonvolatile material.

The polyester has a molecular weight of about 1,000 to about 50,000, and preferably about 1,000 to about 10,000. To achieve the full advantage of the present invention, the polyester has a molecular weight of about 1,500 to about 6,000. The identity of the polyester is not especially limited. However, it is important that a particular polyester has a sufficiently low molecular weight to impart flexibility to the cured coating composition.

The polyester is prepared by methods well known in the art from a diol, triol, polyol or mixture thereof and a polybasic carboxylic acid or anhydride, or mixture thereof. Examples of diols, triols and polyols include, but are not limited to, ethylene glycol, propylene glycol, glycerol, diethylene glycol, dipropylene glycol, triethylene glycol, tripropylene glycol, neopentyl glycol, pentaerythritol, 1,4-butanediol, trimethylol propane, isopropylidene bis(p-phenyleneoxypropanol- 2) and mixtures thereof.

Examples of polybasic carboxylic acids or anhydrides include, but are not limited to, maleic anhydride, maleic acid, fumaric acid, succinic anhydride, succinic acid, adipic acid, phthalic acid, phthalic anhydride, tetrahydrophthalic anhydride, hexahydrophthalic anhydride, endomethylenetetrahydrophthalic anhydride, azelaic acid, sebacic acid, tetrachlorophthalic anhydride, chlorendic acid, isophthalic acid, trimellitic anhydride and mixtures thereof.

A typical polyester illustrated in Example 1 is prepared by admixing the following ingredients and heating at about 210° F., then allowing the temperature to rise to about 430° F. until the acid number is about 10.

EXAMPLE 1

Polyester

| Ingredient | % (by weight) |
| --- | --- |
| Neopentyl Glycol | 33.3 |
| Adipic Acid | 33.7 |
| Isophthalic Acid | 3.6 |
| Trimellitic Anhydride | 4.1 |
| Butyl Carbitol | 21.8 |
| Deionized Water | 3.5 |

The ingredients of Example 1 were mixed, and the resulting mixture was heated until the acid number reached 7.6. The polyester of Example 1, having a weight average molecular weight of about 3000, was present in the mixture in an amount of about 75% by weight nonvolatile material.

Several other batches of the polyester of Example 1 were prepared. These different batches provided a polyester having a weight average molecular weight of about 1,500 to about 6,000. The polyester of each batch provided a coating composition of the present invention useful in an improved two-coat system.

(d) Elastomer

In addition to the phenoxy novolac resin, the phenolic resin, and the polyester, the present coating composition comprises an elastomer to improve adhesion of the coating composition to the primer coat and especially to a plastisol gasket that is applied to the cured coating composition. The elastomer is present in an amount of about 5% to about 20%, and preferably about 5% to about 15%, by weight of nonvolatile material. To achieve the full advantage of the present invention, the elastomer is present in an amount of about 10% to about 15%, by weight of nonvolatile material.

An exemplary, but nonlimiting, elastomer is a butadiene-acrylonitrile copolymer, such as NIPOL® 1042U, available from Zeon Chemicals, Inc., Cleveland, Ohio. Other useful butadiene-acrylonitrile copolymers are NYsyn® 35-8 and NYsyn® 33-8HM, available from DSM Copolymers, Inc., Baton Rouge, La.

Examples of other useful elastomers include, but are not limited to, natural rubber, a butadiene-styrene copolymer, a polybutadiene, an isobutylene-isoprene copolymer, a polychloroprene, a polyurethane, an acrylic elastomer, a styrene-isoprene copolymer, an acrylonitrile-chloroprene copolymer, a vinyl pyridine-butadiene copolymer, and mixtures thereof. A preferred elastomer comprises a copolymer of acrylonitrile.

(e) Nonaqueous Carrier

The present coating composition is a nonaqueous composition, wherein the epoxy novolac resin, the phenolic resin, the polyester and the elastomer are homogeneously dispersed in a nonaqueous carrier. It should be understood that the present coating composition can include a relatively low amount of water, such as up to about 5% by total weight of the composition, without adversely affecting the corrosion-inhibiting coating composition, either prior to or after curing. The water can be added to the composition intentionally, or can be present in the composition inadvertently, such as when water is present in a particular component included in the coating composition.

In general, the nonaqueous carrier has sufficient volatility to evaporate essentially entirely from the coating composition during the curing process, such as during heating at about 350° F. to about 400° F. for about 8 to about 12 minutes. Suitable nonaqueous carriers are known in the art of coating compositions, and include for example, but are not limited to, glycol ethers, like ethylene glycol monomethyl ether, ethylene glycol monoethyl ether, ethylene glycol monobutyl ether, and propylene glycol monomethyl ether; ketones, like cyclohexanone, ethyl aryl ketones, methyl aryl ketones and methyl isoamyl ketone; aromatic hydrocarbons, like toluene, benzene and xylene; aliphatic hydrocarbons, like mineral spirits, kerosene and high flash VM&P naphtha; alcohols, like isopropyl alcohol, n-butyl alcohol and ethyl alcohol; and aprotic solvents, like tetrahydrofuran; chlorinated solvents; esters; glycol ether esters, like propylene glycol monomethyl ether acetate; and combinations thereof.

The nonaqueous carrier usually is included in the composition in a sufficient amount to provide a composition including from about 20% to about 50%, by weight of the composition, of the total weight of (a), (b), (c) and (d). The amount of nonaqueous carrier included in the composition is limited only by the desired, or necessary, rheological properties of the composition. Usually, a sufficient amount of nonaqueous carrier is included in the coating composition to provide a composition that can be processed easily and that can be applied to a metal substrate easily and uniformly, and that is sufficiently removed from the coating composition during curing within the desired cure time.

Therefore, essentially any nonaqueous carrier is useful in the present coating composition as long as the nonaqueous carrier adequately disperses and/or solubilizes the composition components; is inert with respect to interacting with composition components; does not adversely affect the stability of the coating composition or the ability of the corrosion-inhibiting coating to inhibit corrosion of a metal substrate; and evaporates quickly, essentially entirely and relatively rapidly to provide a cured coating composition that inhibits the corrosion of a metal substrate, demonstrates good adhesion and flexibility, and has good chemical and physical properties.

(f) Other Optional Ingredients

A coating composition of the present invention also can include other optional ingredients that do not adversely affect the coating composition or a cured coating composition resulting therefrom. Such optional ingredients are known in the art, and are included in a coating composition to enhance composition esthetics; to facilitate manufacturing, processing, handling and application of the composition; and to further improve a particular functional property of a coating composition or a cured coating composition resulting therefrom.

Such optional ingredients include, for example, dyes, pigments, extenders, fillers, lubricants, anticorrosion agents, flow control agents, thixotropic agents, dispersing agents, antioxidants, adhesion promoters, light stabilizers, and mixtures thereof. Each optional ingredient is included in a sufficient amount to serve its intended purpose, but not in such an amount to adversely affect a coating composition or a cured coating composition resulting therefrom.

One useful optional ingredient is a lubricant, like lanolin, which facilitates manufacture of metal closures by imparting lubricity to sheets of coated metal substrate. A lubricant is present in the coating composition in an amount of 0% to about 2%, and preferably about 0.1% to about 2%, by weight of nonvolatile material.

Another useful optional ingredient is a pigment, like titanium dioxide. A pigment is present in the coating composition in an amount of 0% to about 50%, and preferably about 10% to about 50%, by weight of nonvolatile material.

In accordance with an important feature of the present invention, the present coating composition is free of a halide-containing vinyl polymer, such as polyvinyl chloride. The phrase "free of a halide-containing vinyl polymer" is defined as 1.5% or less of a halide-containing vinyl polymer, by weight of nonvolatile material, as discussed hereafter.

Conventionally, a polyvinyl chloride was included in the coating composition to improve composition economics and to improve adhesion of a plastisol gasket material to the cured coating composition. However, a halide-containing vinyl polymer adversely affects the heat resistance of the cured coating composition.

The present composition does not include a halide-containing vinyl polymer, yet has sufficient adhesion to a plastisol gasket to avoid failure of a metal closure for food products. In addition, the present composition exhibits an excellent heat resistance.

In accordance with an important feature of the present invention, a halide-containing vinyl polymer is not intentionally added to the coating composition. However, 1.5% or less of halide-containing vinyl polymer, i.e., up to about 1.5%, by weight of nonvolatile material, may be present in the coating composition as an inadvertent ingredient. For example, various elastomers are dust-coated with a halide-containing vinyl polymer as an additive. Incorporating a dust-coated elastomer into the present coating composition could introduce a halide-containing vinyl polymer into the composition in an amount of up to 1.5% by weight of nonvolatile material. This amount of a halide-containing vinyl polymer does not adversely affect the cured coating composition.

A coating composition of the present invention is prepared by simply admixing the epoxy novolac resin, the phenolic resin, the polyester, the elastomer, and any optional ingredients, in any desired order, in the nonaqueous carrier, with sufficient agitation. The resulting mixture is admixed until all the composition ingredients are homogeneously dispersed throughout the nonaqueous carrier. Then, an additional amount of the nonaqueous carrier can be added to the coating composition to adjust the amount of nonvolatile material in the coating composition to a predetermined level.

To demonstrate the usefulness of a coating composition of the present invention, the following Examples were prepared, then applied to a metal substrate as a topcoat, and finally cured to provide a coated metal substrate. The coated metal substrates then were tested, comparatively, for use as a closure for a food or beverage container. The cured coatings were tested for an ability to inhibit corrosion of a metal substrate; for adhesion to the metal substrate and to a plastisol gasket; for chemical resistance; for flexibility; and for scratch and mar resistance.

The following Example 2 illustrates one important embodiment of a composition of the present invention and its method of manufacture.

EXAMPLE 2

| Ingredient | % (by weight of total composition) | % (by weight of nonvolatile material) |
| --- | --- | --- |
| Epoxy Novolac Resin[1] | 9.0 | 22.6 |
| Phenolic Resin[2] | 36.3 | 45.4 |
| Polyester[3] | 10.8 | 20 |
| Elastomer[4] | 4.0 | 10 |
| Lubricant[5] | 2.7 | 2 |
| Aromatic Solvent | 4.9 | |
| Diacetone Alcohol | 3.6 | |
| Diisobutyl Ketone | 3.7 | |
| Isophorone | 25.0 | |

[1] ARALDITE® EPN 1139, available from CIBA-GEIGY Corporation, including 100% by weight of a polyfunctional epoxy novolac resin;
[2] a phenolic resin based upon bisphenol A and formaldehyde, including about 50% by weight nonvolatile material in a solvent blend including toluene, deionized water and ethylene glycol monobutyl ether to provide about 18.15%, by weight of the total composition of Example 2, of the phenolic resin;
[3] the polyester of Example 1, including about 75% polyester by weight of nonvolatile material in a solvent blend including butyl carbitol and water to provide about 8% by weight of the total composition of Example 2 of the polyester;
[4] NIPOL® 1042U, available from Zeon Chemicals, Inc., including 100% by weight of a butadiene-acrylonitrile copolymer; and
[5] Lanolin, added as a 29.8% active material.

The composition of Example 2 was prepared by admixing the aromatic solvent, diacetone alcohol and diisobutyl ketone in a vessel to form a nonaqueous carrier mixture. Then, the elastomer was added to the nonaqueous carrier mixture with agitation. Next, the polyester, the epoxy novolac resin, the phenolic resin and the lubricant each were added, individually, to the resulting mixture, with agitation, until all the composition components were homogeneously dispersed throughout the mixture. After sufficient admixing, a composition of the present invention, including about 40% by weight nonvolatile material, was provided. The coating composition of Example 2 was applied to a metal substrate over a primer as a topcoat, then cured for a sufficient time at a sufficient temperature, such as for about 8 to about 12 minutes at about 350° F. to about 400° F., to provide an adherent, crosslinked, cured coating composition on the metal substrate.

A major function of the cured coating composition of Example 2 is to provide a coating layer that: (1) enhances corrosion inhibition of the metal substrate and (2) provides a coating capable of adhering to the plastisol gasket. Conventionally, the primer provides sufficient corrosion-inhibiting properties to adequately protect the metal substrate. However, corrosion inhibition occasionally was insufficient when only one topcoat was applied over the cured primer. Therefore, two topcoats often were used (i.e., a three-coat system). Primers also do not have sufficient adhesion to a plastisol gasket to secure the gasket in place during closure manufacture or food processing.

Surprisingly, it has been found that a coating composition of the present invention, after curing, exhibits excellent chemical and physical properties, exhibits sufficient adhesion to the primer coat to obviate the second topcoat and enhances corrosion inhibition provided by the primer. The present composition also provides excellent adhesion to the plastisol gasket. In addition, the cured coating composition provided by a coating composition of the present invention is sufficiently adhesive to a variety of different types of primer coats and plastisol gaskets, such that the coating composition can be used in a more universal range of applications.

The coating composition of Example 2 also provided a cured coating composition that exhibited excellent flexibility. Flexibility is an important property of a cured coating composition because the metal substrate is coated with a primer and topcoat prior to stamping or otherwise shaping the metal substrate into a desired metal article, such as a metal container or a metal closure for bottles. The plastisol gasket, if present, is applied over the topcoat during the stamping process.

The coated metal substrate undergoes severe deformations during the shaping process, and if a cured coating composition lacks sufficient flexibility, the coating can form cracks, or fractures. Such cracks result in corrosion of the metal substrate because the aqueous contents of the container or bottle have greater access to the metal substrate. In addition, a cured coating composition provided by a composition of the present invention is sufficiently adhered, and remains sufficiently adhered, to the primer during processing into a metal article, thereby further enhancing corrosion inhibition.

The above-described advantages make a coating composition of the present invention useful for application on the interior surface of a variety of metal articles, such as for the interior of vacuum-packed metal containers. The present coating composition is especially useful, after curing, as a corrosion-inhibiting coating on a metal closure for glass or plastic containers that hold food products, like baby food, or food products including volatile acids, like relishes, pickles and hot peppers.

The compositions of the following Examples 3 through 27, including comparative examples, were prepared by the general method outlined above in Example 2. The compositions of Examples 3 through 27 then were applied to a metal substrate as a topcoat over a primer, and cured. The resulting coatings tested for a variety of properties, including adhesion and coating integrity.

EXAMPLE 3

| Ingredient | % (by weight of total composition) | % (by weight of nonvolatile material) |
| --- | --- | --- |
| Epoxy Novolac Resin[1] | 6.5 | 20.3 |
| Phenolic Resin[2] | 26.2 | 41.0 |
| Polyester[3] | 7.9 | 18.2 |
| Elastomer[6] | 38.5 | 18.5 |
| Lubricant[5] | 2.1 | 2.0 |
| Aromatic Solvent | 6.0 | |
| Diacetone Alcohol | 4.5 | |
| Diisobutyl Ketone | 4.5 | |
| Isophorone | 2.8 | |
| Total nonvolatile material - 32.0% by weight | | |

[6] NIPOL® 1042U dissolved in a mixture of aromatic solvent, diacetone alcohol and diisobutyl ketone to provide a solution including 15% by weight NIPOL® 1042U.

The composition of Example 3 was applied to chrome-chrome oxide, tin-free steel panels in a sufficient amount to provide 10 mg (milligrams) of cured coating composition per 4 sq. in. (square inches) of steel panel surface. The composition of Example 3 was applied over a commercial primer coat. After application to the steel panel, the composition of Example 3 was cured for 10 minutes at 380° F. The composition of Example 3 was compared to a commercial topcoat composition used on the interior of metal closure, i.e., MICOFLEX®, a polyvinyl chloride-based composition (i.e., containing about 70% by weight dispersion vinyl) available from The Dexter Corporation, Waukegan, Ill..

After curing the coating compositions, the steel panels coated with either the composition of Example 3 or MICOFLEX® were fabricated into 51 mm diameter metal closures. Tests showed that the composition of Example 3 passed fabrication of the 51 mm diameter closure, integrity requirements at elevated temperatures, and compound adhesion tests.

The compound adhesion tests were performed by two methods. The first method includes application of the plastisol to the length of an appropriately coated panel with an applicator. The plastisol is applied as strip that is 0.5 inch wide and 50 mils thick. The panel then is bent over a 0.25 inch mandrel. Next, a perpendicular incision is made through the plastisol and coating to the metal substrate at the point of greatest curvature of the bend. The panels then are exposed to the appropriate processing conditions.

A high process test is performed by placing the bent panels in a retort and processing for 5 minutes in water that is super heated to 250° F. The panels then are removed and examined for: (1) popping of the plastisol from the coating and (2) popping of the plastisol and coating from the metal substrate. Any observed popping is unacceptable and considered a failure.

Panels also are examined for relative bond strength and adhesion interface by peeling the plastisol. Empirical ratings of 0 to 5 are assigned to the test panels, with a zero rating (best) meaning very difficult to pull and a 5 rating (worst) meaning easily peeled. This high process test is used as a screening procedure before the plastisol-lined closures are manufactured.

On manufactured closures, compound adhesion tests are performed by vacuum sealing the closures either on water-filled containers having 10% headspace or on empty glass containers. These packages are exposed to food processing conditions ranging from pasteurization for 30 minutes at 180° F. in water to high process conditions of 90 minutes at 256° F. and a pressure of 38 psi (pounds per square inch). The containers then are cooled and examined for integrity. The containers are tested for vacuum. The containers are opened and the adhesion of the gasket to coating also is examined. Any loss in vacuum, or any plastisol movement or plastisol lifting, is considered is a failure.

During specific stages of the closure fabrication process, hot tooling can contact the coated metal. In some instances, the coatings can soften and lose adhesion to the metal substrate, thereby leaving sites susceptible to corrosion. Therefore, it is important that film integrity is maintained at elevated temperatures. This is simulated in a test wherein coated metal panels are exposed to heated tooling. Coated test panels are placed between an upper and a lower die. The lower die is fixed and maintained at 350° F., while the upper die is movable and maintained at 500° F. The coated panels are placed between the die, which then are closed under 60 psi air pressure. The coated panels are exposed at various time intervals, and then examined microscopically for film integrity and adhesion.

The composition of Example 3 also outperformed MICOFLEX® in a 60-day accelerated corrosion test. The closures also were tested for dog food process blush resistance, plastisol gasket adhesion and flexibility. The composition of Example 3 passed all these tests.

In addition, vinyl chloride-based compositions have exhibited mud cracking problems during curing. The composition of Example 3 outperformed the standard vinyl chloride-based topcoat compositions by exhibiting excellent topcoat mudcrack resistance.

In one test, the composition of Example 3 was utilized as a topcoat on the interior of a 51 mm diameter metal closure. The closures were tested for corrosion resistance using 2% acetic acid. The 2% acetic acid was packaged hot in a glass container and immediately sealed with a metal closure. The vacuum resulting from cooling was left intact, and the containers were stored at 100° F. for one and two months. Test results showed that the composition of Example 3 outperformed the polyvinyl chloride-based control coating by exhibiting less pitting, lower average pit depth and an overall better appearance of the metal closure.

The composition of Example 3 was pigmented by adding 47 wt. % (weight percent) titanium dioxide (TiO$_2$) to the composition of Example 3. After application to steel panels and curing, the pigmented version of Example 3 also passed the performance tests necessary for a topcoat for the interior of a metal closure.

The following composition of Example 4 was prepared in a manner essentially identical to the method of preparing the composition of Example 2.

EXAMPLE 4

| Ingredient | % (by weight of nonvolatile material) |
|---|---|
| Epoxy Novolac Resin[1] | 23.1 |
| Phenolic Resin[2] | 46.3 |
| Polyester[3] | 20.4 |
| Elastomer[4] | 10.2 |

To further demonstrate the properties of a composition of the present invention, the composition of Example 2 was applied to steel panels in a manner identical to the composition of Example 3, and the coated steel panels were manufactured into 51 mm diameter closures. The composition of Example 2 was applied over a pigmented primer coat. The composition of Example 2 provided a high-gloss topcoat that passed metal closure fabrication and high temperature tooling exposure tests. The cured coating composition also passed plastisol adhesion testing and 60-day accelerated corrosion testing with 2% acetic acid. The cured coating composition of Example 2 demonstrated an excellent ability to withstand scratching of the metal closure sidewall and demonstrated improved adhesion.

In another test, the composition of Example 2 was compared to a standard polyvinyl chloride-based topcoat composition in a 60-day accelerated corrosion test on 63 mm diameter metal closure. The composition of Example 2 was applied over a primer at the rate of 10 mg per 4 sq. in. The standard polyvinyl chloride-based composition was applied over the same primer at a rate of 35 mg per 4 sq. in. In separate tests, the compositions were applied over different types of primers. The composition of Example 2, applied at a substantially lower rate than the standard polyvinyl chloride-based topcoat, exhibited no failures in the twenty-four closures tested for low process plastisol adhesion and no failures in the twenty-four closures tested for high process plastisol adhesion.

The composition of Example 4, which lacks a lubricant, performed identically to the composition of Example 2.

|  | Example 5[7] | Example 6 | Example 7 | Example 8 | Example 9 (Comparative) |
|---|---|---|---|---|---|
| Epoxy Novolac Resin[1] | 20.6% | 20.3% | 21.4% | 22.8% | 22.6% |
| Phenolic Resin[2] | 41.1% | 41.0% | 42.9% | 45.6% | 45.4% |
| Polyester[3] | 18.8% | 18.2% | 19.4% | 19.5% | 11.5% |
| Elastomer[4] | 18.9% | 18.5% | 14.3% | 10.1% | 18.5% |
| Lubricant[5] | — | 2.0% | 2.0% | 2.0% | 2.0% |
| % NVM[8] | 29.4% | 32.0% | 35.0% | 39.8% | |

|  | Example 10 (Comparative) | Example 11 | Example 12 |
|---|---|---|---|
| Epoxy Novolac Resin[1] | 13.1% | 22.6% | 15.4% |
| Phenolic Resin[2] | 45.7% | 45.4% | 31.1% |
| Polyester[3] | 19.6% | 20.0% | 13.8% |
| Elastomer[4] | 19.6% | 10.0% | 14.0% |
| Lubricant[5] | 2.0% | 2.0% | 2.0% |
| Titanium Dioxide |  |  | 23.7% |
| % NVM[8] |  | 40.0% |  |

[7] all percentages are weight percent of nonvolatile material;
[8] percent nonvolatile material in the composition.

The compositions of Examples 5–12 were prepared in an identical manner as the composition of Example 2. The compositions of Examples 5 and 6 are essentially identical except for the addition of a lubricant to the composition of Example 6. The composition of Example 6 was applied over a primer as a topcoat to tin-free steel panels at a rate of 10 mg per 4 sq. in. and cured at 380° F. for 10 minutes.

The cured coating composition of Example 6 was compared to polyvinyl chloride-based topcoat compositions, including MICOFLEX®. The cured coating composition of Example 6 performed equally to, or outperformed, the comparative polyvinyl chloride-based compositions in high temperature tooling tests, 60-day accelerated corrosion tests, wedgebend tests and plastisol adhesion tests. In the plastisol adhesion test, the metal closure coated with the cured coating composition of Example 6 had zero failures in eight tested panels. Metal closures coated with the polyvinyl chloride-based compositions failed the plastisol adhesion tests.

The composition of Example 6 also was compared to the composition of Example 12, which is a pigmented version of the composition of Example 6. The composition of Example 12 performed comparably to the composition of Example 6 as topcoat for the interior of metal closures with respect to 60-day corrosion tests and plastisol adhesion tests.

In similar tests, the cured coating compositions of Examples 7 and 8 performed well. However, the comparative compositions of Examples 9 and 10 failed the plastisol adhesion tests. The comparative composition of Example 9 contains too low an amount of polyester for sufficient adhesion and flexibility. The comparative composition of Example 10 failed because the weight ratio of epoxy novolac resin to phenolic resin is 1:3.5. The composition of Example 11 provided excellent adhesion of the cured coating composition both to the plastisol gasket and the primer coat.

The following Examples 13–27 illustrate that the weight ratio of epoxy novolac resin to phenolic resin, and the weight ratio of elastomer to polyester, are important with respect to optimizing performance of the present coating composition.

|  | Example 13 | Example 14 | Example 15 | Example 16 | Example 17 | Example 18 | Example 19 |
|---|---|---|---|---|---|---|---|
| Epoxy Novolac Resin[1] | 23.1 | 17.35 | 20.13 | 25.68 | 27.76 | 14.98 | 17.47 |
| Phenolic Resin[2] | 46.3 | 52.05 | 49.27 | 43.72 | 41.64 | 30.0 | 35.0 |
| Polyester[3] | 20.4 | 20.4 | 20.4 | 20.4 | 20.4 | 44.82 | 37.33 |
| Elastomer[4] | 10.2 | 10.2 | 10.2 | 10.2 | 10.2 | 10.2 | 10.2 |
| E/P Ratio E/P (epoxy novolac/phenolic) | 33.3/66.7 | 25.0/75.0 | 29.0/71.0 | 37.0/63.0 | 40.0/60.0 | 33.3/66.7 | 33.3/66.7 |
| Plastisol Adhesion | 0/8 | 0/8 | 0/8 | 0/8 | 0/8 | 0/8 | 0/8 |
| Peel Strength[9] | 0 | 2 | 0 | 0 | 1 | 4 | 4 |

|  | Example 20 | Example 21 | Example 22 | Example 23 | Example 24 | Example 25 | Example 26 | Example 27 |
|---|---|---|---|---|---|---|---|---|
| Epoxy Novolac Resin[1] | 20.0 | 25.96 | 23.1 | 23.1 | 23.1 | 14.98 | 17.47 | 20.0 |
| Phenolic Resin[2] | 40.0 | 52.0 | 46.3 | 46.3 | 46.3 | 30.0 | 35.0 | 40.0 |
| Polyester[3] | 10.2 | 10.2 | 25.6 | 15.6 | 10.6 | 35.2 | 27.53 | 20.0 |
| Elastomer[4] | 29.8 | 11.84 | 5.0 | 15.0 | 20.0 | 20.0 | 20.0 | 20.0 |

| | | | | | | | | | |
|---|---|---|---|---|---|---|---|---|---|
| E/P Ratio (epoxy novolac/phenolic) | E/P | 33.3/66.7 | 33.3/66.7 | 33.3/66.7 | 33.3/66.7 | 33.3/66.7 | 33.3/66.7 | 33.3/66.7 | 33.3/66.7 |
| Plastisol Adhesion | | 0/8 | 0/8 | 0/8 | 0/8 | 0/8 | 0/8 | 0/8 | 0/8 |
| Peel Strength[9] | | 2 | 1 | 4 | 2 | 4 | 3.5 | 3.5 | 3.5 |

[9] The empirical scale for peeling strength range, from 0 to 5, with 5 being the worst rating.

The compositions of Examples 13–27 show that the ratio of epoxy novolac resin to phenolic resin should be about 33:66 to about 25:75, and especially about 33:66, to maximize composition performance. The adhesive strength of the coating composition to the plastisol gasket decreases outside this weight ratio of epoxy novolac resin to phenolic resin. Examples 13–27 also show that at a constant epoxy novolac/phenolic weight ratio of 33:66, the adhesive strength of the coating composition to the plastisol gasket decreases as the weight of polyester increases.

In addition, Examples 13, 22, 23 and 24 show that the adhesive properties of the coating composition decrease when the weight ratio of elastomer to polyester is outside the range of about 1:1 to about 1:2. It also was observed that if the polyester is present in an amount significantly above about 20% by weight of the coating composition, then the high temperature tooling exposure resistance of the cured coating composition, although still acceptable, is decreased.

The properties demonstrated by a coating composition of the present invention, and a cured coating composition resulting therefrom, show that a halide-containing vinyl polymer is not necessary to provide adhesion to a primer coat or a plastisol gasket. The present coating composition therefore is useful as a topcoat on the interior of metal closures, and especially metal closures for food and beverage containers. The elimination of the halide-containing vinyl polymer is important with respect to eliminating the environmental and toxicological concerns associated with such polymers. Surprisingly, the halide-containing vinyl polymer has been eliminated, and the present composition maintains the advantageous physical and chemical properties associated with compositions including a halide-containing vinyl polymer.

The present coating composition can be used in conjunction with a variety of types of primers and plastisol gaskets. The present coating composition therefore has a more universal range of applications. The present coating compositions, unlike prior compositions, do not require a pigment, like $TiO_2$, to achieve sufficient performance and film integrity. The performance characteristics of the present coating composition is achieved by a novel combination of ingredients, as opposed to halide-containing vinyl polymers and pigments. The cured coating composition also has a high gloss and tooling wear is reduced during manufacture of the metal closure.

The present coating composition has superior heat resistance properties, improved film integrity, and accordingly, improved corrosion resistance properties. These and the above-described advantages make a coating composition of the present invention especially useful for application on the interior surface of a metal closure for food and beverage containers.

Obviously, many modifications and variations of the invention as hereinbefore set forth can be made without departing from the spirit and scope thereof and therefore only such limitations should be imposed as are indicated by the appended claims.

I claim:
1. A coating composition for application to a primed metal substrate comprising:
   (a) about 13% to about 30%, by weight of nonvolatile material, of an epoxy novolac resin having an epoxy functionality of about 2 to about 6 and an epoxy equivalent weight of about 100 to about 210;
   (b) about 40% to about 60%, by weight of nonvolatile material, of a phenolic resin;
   (c) about 15% to about 30%, by weight of nonvolatile material, of a polyester having a weight average molecular weight of about 1,000 to about 50,000;
   (d) about 5% to about 20%, by weight of nonvolatile material, of an elastomer; and
   (e) a nonaqueous carrier;
   wherein the composition has a ratio of epoxy novolac resin to phenolic resin of about 25:75 to about 33:66 and a ratio of elastomer to polyester of about 1:1 to about 1:2; and
   wherein the composition is free of a halide-containing vinyl polymer.

2. The coating composition of claim 1 further comprising 0% to about 2%, by weight of nonvolatile material, of a lubricant; and 0% to about 50% by weight of nonvolatile material, of a pigment.

3. The coating composition of claim 1 comprising about 15% to about 25%, by weight of nonvolatile material, of an epoxy novolac resin.

4. The coating composition of claim 1 wherein the epoxy functionality of the epoxy novolac resin is greater than about 2 to about 5.

5. The coating composition of claim 1 wherein the epoxy novolac resin has an epoxy equivalent weight of about 150 to about 210.

6. The coating composition of claim 1 wherein the epoxy novolac resin is selected from the group consisting of an epoxy phenol novolac resin, an epoxy cresol novolac resin, a polynuclear phenol-glycidyl ether resin, a tetraglycidyl methylene-dianiline resin, a triglycidyl p-aminophenol resin, a triglycidyl isocyanurate, and mixtures thereof.

7. The composition of claim 1 comprising about 40% to about 50%, by weight of nonvolatile material, of the phenolic resin.

8. The coating composition of claim 1 wherein the phenolic resin has a molecular weight of about 1,000 to about 8,000.

9. The composition of claim 1 wherein the phenolic resin comprises a phenol component selected from the group consisting of phenol, bisphenol A, cresylic acid, and combinations thereof.

10. The composition of claim 1 comprising about 15% to about 25%, by weight of nonvolatile material, of the polyester.

11. The composition of claim 1 wherein the polyester has a molecular weight of about 1,000 to about 10,000.

12. The composition of claim 1 wherein the polyester has a molecular weight of about 1,500 to about 6,000.

13. The composition of claim 1 comprising about 5% to about 15%, by weight of nonvolatile material, of the elastomer.

14. The composition of claim 1 wherein the elastomer comprises a copolymer of acrylonitrile.

15. The composition of claim 1 wherein the elastomer is selected from the group consisting of butadiene-acrylonitrile, natural rubber, a butadiene-styrene copolymer, a polybutadiene, an isobutylene-isoprene copolymer, a polychloroprene, a polyurethane, an acrylic elastomer, a styrene-isoprene copolymer, an acrylonitrile-chloroprene copolymer, a vinyl pyridine-butadiene copolymer, and mixtures thereof.

16. The composition of claim 1 wherein the ratio of epoxy novolac resin to phenolic resin is about 30:70 to about 40:60.

17. The composition of claim 2 wherein the composition includes about 10% to about 50%, by weight of nonvolatile material, of a pigment.

18. The composition of claim 2 wherein the pigment is titanium dioxide.

19. The composition of claim 1 comprising:
  (a) about 20% to about 25%, by weight of nonvolatile material, of an epoxy novolac resin having an epoxy functionality of greater than about 2 to about 6 and an epoxy equivalent weight of about 100 to about 210;
  (b) about 45% to about 50%, by weight of nonvolatile material, of a phenolic resin;
  (c) about 20% to about 25%, by weight of nonvolatile material, of a polyester having a weight average molecular weight of about 1,000 to about 10,000; and
  (d) about 10% to about 15%, by weight of nonvolatile material, of an elastomer,
wherein the composition is free of a halide-containing vinyl polymer, and has a ratio of epoxy novolac resin to phenolic resin of about 30:70 to about 40:60 and a ratio of elastomer to polyester of about 1:1 to about 1:2.

20. The composition of claim 19 further comprising about 0% to about 2% of a lubricant and about 10% to about 50% of a pigment, by weight of nonvolatile material.

21. A method of coating a metal substrate comprising:
  (a) applying a primer coating composition to at least one surface of the metal substrate;
  (b) heating the metal substrate having the primer coating composition applied thereon for a sufficient time and at a sufficient temperature to cure the primer coating composition and provide a primed metal substrate;
  (c) applying a coating composition to the primed metal substrate, said coating composition comprising:
    (i) about 13% to about 30%, by weight of nonvolatile material, of an epoxy novolac resin having an epoxy functionality of about 2 to about 6 and an epoxy equivalent weight of about 100 to about 210,
    (ii) about 40% to about 60%, by weight of nonvolatile material, of a phenolic resin,
    (iii) about 15% to about 30%, by weight of nonvolatile material, of a polyester having a weight average molecular weight of about 1,000 to about 50,000,
    (iv) about 5% to about 20%, by weight of nonvolatile material, of an elastomer, and
    (v) a nonaqueous carrier,
      wherein the composition has a ratio of epoxy novolac resin to phenolic resin of about 25:75 to about 33:66 and a ratio of elastomer to polyester is about 1:1 to about 1:2, and
      wherein the composition is free of a halide-containing vinyl polymer; and
  (d) heating the primed metal substrate having the coating composition applied thereon for a sufficient time and at a sufficient temperature to remove the nonaqueous carrier from the composition and provide a crosslinked cured coating composition.

22. The method of claim 21 further comprising 0% to about 2%, by weight of nonvolatile material, of a lubricant; and 0% to about 50%, by weight of nonvolatile material, of a pigment.

23. The method of claim 21 wherein the primed metal substrate having the coating composition applied thereon is heated for about 8 minutes to about 2 minutes at a temperature of about 350° F. to about 400° F.

24. A metal article having at least one surface thereof coated with a primer and an adherent layer of a cured coating composition, said cured coating composition resulting from curing a coating composition comprising:
  (a) about 13% to about 30%, by weight of nonvolatile material, of an epoxy novolac resin having an epoxy functionality of about 2 to about 6 and an epoxy equivalent weight of about 100 to about 210,
  (b) about 40% to about 60%, by weight of nonvolatile material, of a phenolic resin,
  (c) about 15% to about 30%, by weight of nonvolatile material, of a polyester having a weight average molecular weight of about 1,000 to about 50,000,
  (d) about 5% to about 20%, by weight of nonvolatile material, of an elastomer, and
  (e) a nonaqueous carrier,
    wherein the composition has a ratio of epoxy novolac resin to phenolic resin of about 25:75 to about 33:66 and a ratio of elastomer to polyester of about 1:1 to about 1:2; and
    wherein the composition is free of a halide-containing vinyl polymer.

25. The metal article of claim 24 further comprising 0% to about 2%, by weight of nonvolatile material, of a lubricant; and 0% to about 50%, by weight of nonvolatile material, of a pigment.

* * * * *

UNITED STATES PATENT AND TRADEMARK OFFICE
CERTIFICATE OF CORRECTION

PATENT NO. : 5,491,031
DATED : February 13, 1996
INVENTOR(S) : Lawrence P. Seibel It is certified that error appears in the above-identified patent and that said Letters Patent is hereby corrected as shown below:

Column 22, line 23, "2 minutes" should be --12 minutes--.

Signed and Sealed this

Twenty-first Day of May, 1996

Attest:

BRUCE LEHMAN

Attesting Officer                Commissioner of Patents and Trademarks